US008775432B2

(12) United States Patent
Gelhar (10) Patent No.: US 8,775,432 B2
(45) Date of Patent: Jul. 8, 2014

(54) INDEXING LONG WORD LISTS IN DATABASES

(75) Inventor: Jens Gelhar, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 424 days.

(21) Appl. No.: 11/752,418

(22) Filed: May 23, 2007

(65) Prior Publication Data

US 2008/0046396 A1    Feb. 21, 2008

(30) Foreign Application Priority Data

May 23, 2006    (EP) ..................................... 06010675

(51) Int. Cl.
*G06F 17/30*    (2006.01)
(52) U.S. Cl.
USPC .......................................... 707/741; 707/743
(58) Field of Classification Search
USPC ................. 707/1, 3, 100, 101, 102, 741, 743
See application file for complete search history.

(56) References Cited

U.S. PATENT DOCUMENTS

| 5,805,911 | A |  | 9/1998 | Miller ............................ 715/534 |
| 5,953,541 | A |  | 9/1999 | King et al. ...................... 710/67 |
| 6,662,184 | B1 |  | 12/2003 | Friedberg ....................... 707/100 |
| 2002/0059165 | A1 | * | 5/2002 | Hersh et al. ........................ 707/1 |
| 2002/0087514 | A1 | * | 7/2002 | Payne et al. ....................... 707/1 |
| 2004/0006562 | A1 | * | 1/2004 | Wagner .............................. 707/5 |
| 2004/0133559 | A1 | * | 7/2004 | DeVorzon et al. ................ 707/3 |
| 2004/0220831 | A1 | * | 11/2004 | Fabricant .......................... 705/2 |
| 2007/0050128 | A1 | * | 3/2007 | Lee et al. ....................... 701/200 |

FOREIGN PATENT DOCUMENTS

| EP | 0 419 889 | A | 4/1991 |
| WO | WO 01/82044 | A | 11/2001 |

OTHER PUBLICATIONS

Saake G., Heuer A., "Datenbanken Implementierungstechniken," Datenbanken Implementierungstechniken, 1999, Paderborn, Germany.
Yazdani N., et al., "Prefix Trees: New Efficient Data Structure for Matching Strings of Different Lengths," 2001 International Symposium on Database Engineering & Applications, Jul. 16-18, 2001, IEEE, Piscataway, New Jersey.
Lomet, D.B., "Prefix* B-Trees," IBM Technical Disclosure Bulletin, vol. 24, No. 5, Oct. 1981, IBM Corp., New York.

* cited by examiner

Primary Examiner — Apu Mofiz
Assistant Examiner — Fariborz Khoshnoodi
(74) Attorney, Agent, or Firm — O'Shea Getz P.C.

(57) ABSTRACT

A vehicle navigation system having an input device, a storage device, a processor, and an output device. The storage device stores a database of geographical locations, such as the names of states, cities, streets, or countries. The database has a data list that includes data sub-lists, where the data sub-lists may have one or more data sub-list elements. Each data sub-list may have an assigned unique name. The data sub-lists also may be divided into parts, such that each part is assigned a unique name. The processor is operative to index the data sub-lists or the parts of a divided data sub-list. The processor may be further operative to search the database for a data sub-list element given an input from a user, and the output device may output one or more data sub-list elements from the database based on the search performed by the processor.

30 Claims, 8 Drawing Sheets

INDEXING LONG WORD LISTS IN DATABASES

BACKGROUND

1. Priority Claim

This application claims the benefit of priority from European Patent Application No. 06010675.4, filed May 23, 2006, which is incorporated here by reference in its entirety.

2. Technical Field

This invention relates to a system and method for indexing big word lists in databases. In particular, the invention relates to a system and method for indexing big word lists where sub-lists of data entries are indexed, and the sub-lists are further indexed.

3. Related Art

Navigation systems are increasingly prevalent in vehicles such as mid- and high-class automobiles. Navigation systems perform route guidance to a pre-determined destination input by a user. Such systems may verbally provide both route guidance and operation by the user using a speech control/recognition system or a display device.

Current navigation systems usually use large databases managed by a database management system that store lists of entries representing geographic data, such as cities, streets, points of interest, etc. These lists of entries may become very long for practical applications, for example, when the user uses the speech control recognition system or a tactile input device, such as a keyboard or touch-screen liquid crystal display. Consequently, management of these lists becomes difficult, especially when considering the limited computer resources available in navigation systems.

Current navigation systems often allow the user to choose from different entries of lists during separate operation stages. For example, in the route planning stage the navigation system may prompt the user to input a city and then a street name. The user may perform the input manually or verbally.

Usually, the lists are presented by displaying entries in alphabetical or lexicographic order. The user may scroll through displayed lists until he finds a desired entry. The user may then mark this entry or may directly input text using a keyboard, touch-screen LCD, or the speech-recognition system. Where the user uses the keyboard, the database management system will often perform an incremental search on the other entries in the list. The incremental search may require the input of only the first significant characters of an entire word, such as the name of a city the user wants to be guided to. Following unique characters may be automatically added.

In order to accelerate the selection process of geographical location, such as a city or a street, after the entry of one or more characters the navigation system may present the user the next characters of stored entries from which to choose. When the user has entered a predetermined amount of characters to identify a desired entry, the input may be automatically completed and the user may be prompted to confirm the identified entry.

In current navigation systems, databases may be indexed. Indexing may allow for faster database operations, such as selecting, deleting, and updating data entries. Indexing also may serve for sorting the data entries in lists. In traditional databases, indices are transparent to the application using the database. For example, during an index-supported search of the database by the navigation system, the navigation system is usually unable to access the indexed data contents.

Indices of a database are usually implemented as a tree structure, such as a binary tree, assuming a pre-defined sort order of the managed data. Alternatively, the indexing itself may establish a sort order. A search for an entry of a list may be performed in accordance with the implemented tree structure. Current methods of indexing use indices that range over all the data entries of a particular data class. For example, current methods may use indices that range over the entire set of city names or street names. Reference to sub-sets of the street names, such as street names corresponding to a particular city, may be made by using two-dimensional indices. This technique is generally known as column indexing. The first columns of an index may represent a city and the second column of an index may represent a street. Multi-column indices range over the entirety of data entries may be stored as different data types.

Additionally, indices may be used to calculate the remaining alphanumeric characters for a partial alphanumeric input previously entered by the user. Alternatively, the remaining alphanumeric characters may be calculated and stored in a predetermined tree structure.

However, current indexing techniques often lead to a huge data structure for each index that ranges over all the data entries for a data class stored in the database. Thus, where the computer and storage resources are rather limited, such as in current navigation systems, it is often difficult to transfer the entire index into a main memory. Information about possible characters following a partial alphanumeric input by the user may further require additional storage capacities and techniques, such as virtual memory and memory swapping. Access to these additional storage capacities and techniques during runtime of a search for a data entry often leads to an extensive computational load accompanied by delays in processing the user's input. Extensive computational loads and delays further lead to an undesirable waiting time by the user.

Accordingly, there is a need for a system and method for indexing entries in databases that allow for faster access to data entries. In addition, there is a need for a system and method that manages and recognizes data entries in data lists that works effectively where limited computer resources are available.

SUMMARY

A vehicle navigation system that has an input device, a storage device, a processor, and an output device. The storage device stores a database of geographical locations, such as the names of cities, streets, countries, states, or combinations thereof. The database has a data list that includes data sub-lists. The data sub-lists may have one or more data sub-list elements representing the names of geographical locations. Bach data sub-list may have an assigned unique name. The data sub-lists also may be divided into parts such that each part is assigned a unique name.

The processor may separately index the data sub-lists. Indexing may include assigning an index to each of the data sub-lists such that each index is a common prefix of the sub-lists elements. Alternatively, one or more indices may be a prefix or include one character from a unique name assigned to one or more parts of one or more divided data sub-lists. The processor may be further configured to retrieve one or more data sub-list elements from a data sub-list using the one or more assigned indices and an input received from the input device. The output device may be coupled with the processor and operative to output the one or more data sub-list elements retrievable by the processor.

BRIEF DESCRIPTION OF THE DRAWINGS

The system may be better understood with reference to the following drawings and description. The components in the FIG. 1 is a block diagram of one example of a vehicle navigation system that indexes data sub-lists stored in a database.

DETAILED DESCRIPTION

Figure 1:
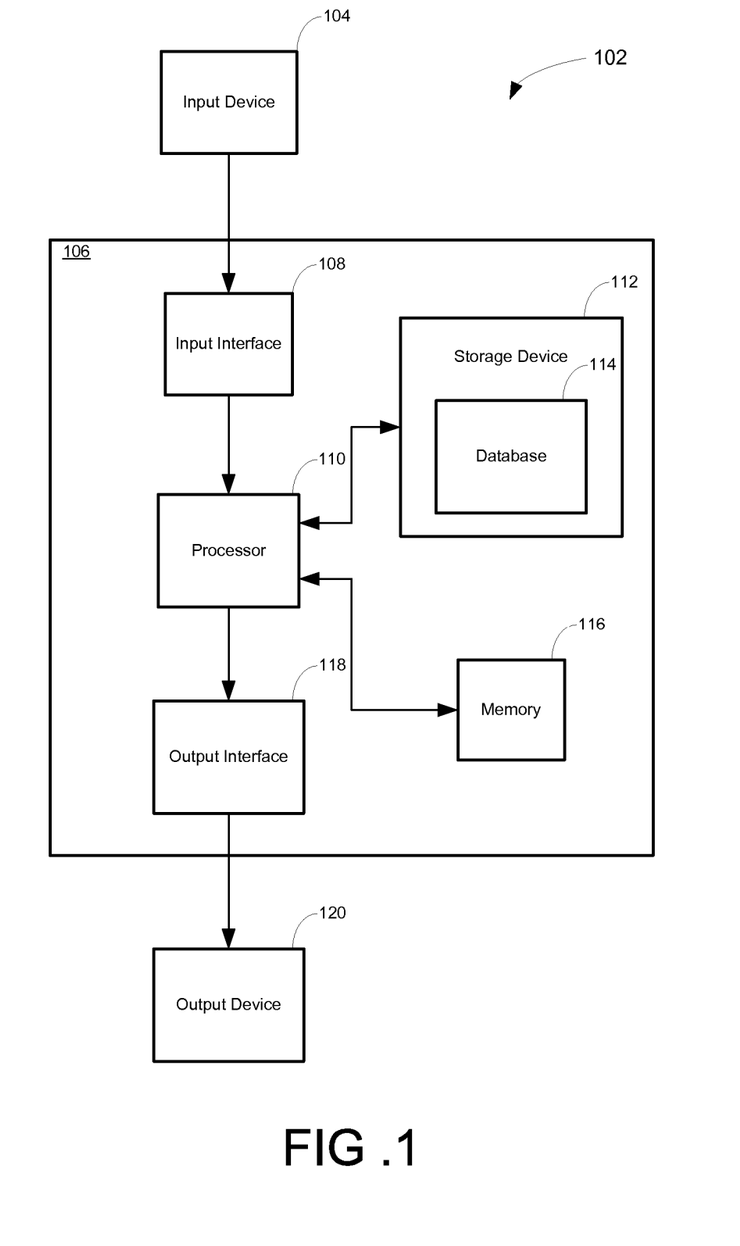

FIG. 1 depicts a vehicle navigation system 102 that may have an input device 104, a computer 106 coupled with the input device 104, and an output device 120 coupled with the computer 106. The computer 106 may have an input interface 108 coupled with the input device 104, a processor 110 coupled with the input interface 108, a storage device 112 coupled with the processor 110, a memory device 116 coupled with the processor 110, and an output interface 118 coupled with the processor 110. The output interface 118 also may be coupled with the output device 120.

The input device 104 may be operative to receive input from a user of the vehicle navigation system 102. The input device 104 may be any now known or later developed input device. The input device 104 may be an audio input device, a tactile input device, a memory storage device, or combinations thereof. As examples, the input device 104 may be a microphone, a keyboard, mouse, trackball, touch pad or other pointer control. In another example, the input device 104 may be a memory storage device, such as a hard disk drive, compact disc, digital video disc, flash memory, random access memory, or combinations thereof. The input device 104 may receive the name of a geographical location for storing in the storage device 112, operative to receive the name of a geographical location for retrieval from the storage device 112, or combinations thereof.

The input interface 108 coupled with the input device 104 may receive the input from the input device 104. The input interface 108 may be a wired interface, for example, PS/2, USB, Ethernet, IDE/ATA, SCSI, SATA, or IEEE 1394, a wireless interface, such as 802.11a/b/g, Bluetooth, RF, infrared, an audio interface, such as stereo, S/PDIF, AES/EBU, or combinations thereof. As one example, the input interface 108 may be a PS/2 interface coupled with the input device 104, which may be a keyboard. In another example, the input interface 108 may be an IDE/ATA interface and the input device 104 may be a hard drive. In yet a further example, the input interface 108 may be a socket for a ¼ inch mono phone plug and the input device 104 may be a microphone.

The processor 110 coupled with the input interface 108 may process the input received from the input device 104. The processor 110 may be a general processor, a data signal processor, graphics card, graphics chip, personal computer, motherboard, memories, buffers, scan converters, filters, interpolators, field programmable gate array, application-specific integrated circuit, analog circuits, digital circuits, combinations thereof, or any other now known or later developed processor.

The storage device 112 coupled with the processor 110 may store a database 114 having data sub-lists with data sub-list elements. The storage device 112 may be random access memory, cache memory, dynamic random access memory, static random access memory, flash memory, virtual memory, video memory, magnetic memory, optical memory, any known or later developed memory technology, or combinations thereof. As examples, the storage device 112 may be a hard drive, a DVD+RW drive, or a secure digital (SD) card. The storage device 112 further may allow access to stored data, such as the database 114, by one or more devices including, but not limited to, the processor 110, the memory 116, the input device 104, the output device 120, one or more devices coupled with the system 102, or combinations thereof.

The database 114 stored on the storage device 112 may store a data list comprised of one or more data sub-lists. The data sub-lists may be stored as separate data entries in the database, and each data sub-list may have one or more data sub-list elements. The sub-list elements may be words consisting of characters. Characters may be alphanumeric characters, such as letters, numbers or other symbols. As an example, the sub-list elements may include characters such as those found on a keyboard. The processor 110 may further divide each of the data sub-lists into parts, and may assign each part of a divided sub-list a unique name. The division of the data list into the data sub-lists, the division of the data sub-lists into parts, or combinations thereof, may be arbitrary, based on identical initial strings of sub-list elements, or combinations thereof.

The processor 110 also may be operative to assign an index to one or more data sub-lists. In assigning an index to a data sub-list, an index may include a character from one or more sub-list elements from a data sub-list. In another example, an index may include one character, but less than all the characters, from one or more sub-list elements of a data sub-list. Alternatively, the index assigned to a data sub-list could be a common prefix of at least two sub-list elements of the data sub-list. For example, one or more indices for each sub-list may include one or more initial characters of a respective sub-list element, such as the first two characters of a word that has five characters.

Alternatively, or in addition to, assigning an index to a data sub-list, the processor 110 could assign an index to one or more parts of a divided data sub-list. For example, where the divided parts of a data sub-list are each assigned a unique name, the processor 110 could assign an index to each part of a divided data sub-list based on the corresponding unique name. In this example, the assigned index could include at least one character of the assigned unique name.

The indices of the data sub-lists or the divided parts of the data sub-lists assigned by the processor 110 may represent available components of a list structure that may be used in determining a next character input by the user to identify a sub-list element or a set of sub-list elements. Furthermore, because the data sub-lists may be stored as separate data entities in the database 114, and because each data sub-list may be indexed separately, the assigned indices may not extend over different columns of data tables stored in the database 114. Hence, the assignment of indices by the processor 110 to data sub-lists results in smaller index structures, which may use less of the memory 116 available to the computer 106.

Searches performed by the processor 110 on the database for a data sub-list element using the indices previously described may result in reduced processor load. For example, as the indices assigned to data sub-lists, parts of data sub-lists, sub-list elements, or combinations thereof, may be prefixes or sub-strings rather than full text representations, faster searches for a data list element in the database performable by the processor 110 may be obtained.

A memory device 116 is coupled with the processor 110 and is operative to temporarily store data retrieved from the database 114. For example, the memory device 116 could store indices for one or more data sub-lists while the processor 110 is performing a search for a data sub-list element in the database 114. As previously described above, because the indices assigned to data sub-lists may not extend over the entire data list stored by the database 114, the memory device 116 may be a smaller amount of memory of a memory type. The memory device 116 may be random access memory, cache memory, dynamic random access memory, static random access memory, flash memory, virtual memory, video memory, magnetic memory, optical memory, any known or later developed memory technology, or combinations thereof.

An output interface 118 may be coupled with the processor 110 and may facilitate the output of data to the output device 120. The output interface 118 may be a wired interface, such as PS/2, USB, Ethernet, IDE/ATA, SCSI, SATA, IEEE 1394, VGA, DVI, or HDMI, a wireless interface, such as 802.11a/b/g/n, Bluetooth, RF, infrared, an audio interface, such as stereo, S/PDIF, AES/EBU, EIAJ optical, or combinations thereof.

The output device 120 coupled with the output interface 118 is operative to output data from the processor 110. The output device 120 may be a display device such as a monitor, CRT, LCD, plasma screen, flat-panel, projector, any other now known or later developed display device, an audio output device, such as a speaker, or combinations thereof. As an example, the output device 120 may be an LCD and operative to display one or more data sub-list elements from the database 114 selectable by the user. Alternatively, the output device 120 may be a speaker and operative to announce one or more data sub-list elements from the database 114. For example, the processor 110 may use software or other techniques to convert one or more data sub-list elements into recognizable speech.

Figure 2:
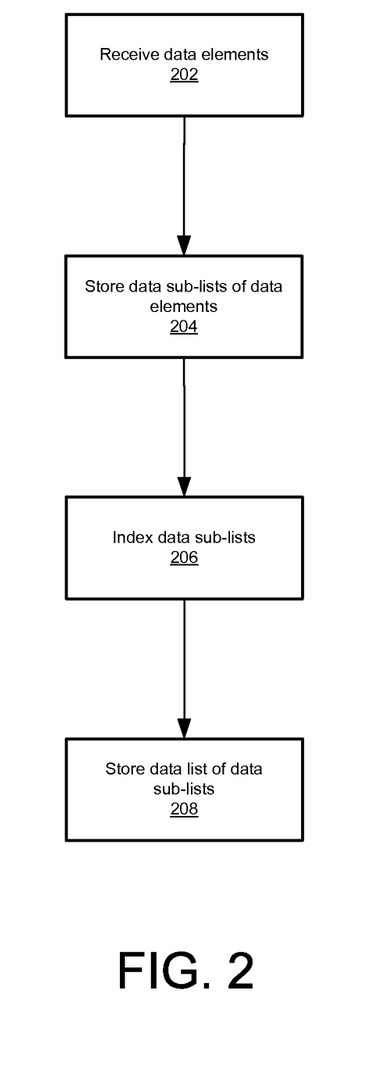
FIG. 2 is an overview flow chart of one example of a method for storing and indexing data sub-lists in a database.

FIG. 2 is an overview flow chart of one example of a method for storing and indexing data sub-lists in the database 114. Initially, the processor 110 may populate the database 114 with data sub-list elements (Block 202). The processor 110 may receive the data sub-list elements from a user or other device, such as a computer, using the input device 104. As previously discussed, the data sub-list elements may include geographical locations. After receiving the data sub-list elements, the processor 110 may then create one or more data sub-lists using the received data sub-list elements, and store the one or more data sub-lists in the database 114 (Block 204). The one or more data sub-lists may then be indexed (Block 206). A data list of the data sub-lists may then be stored in the database 114 (Block 208).

Figure 3:
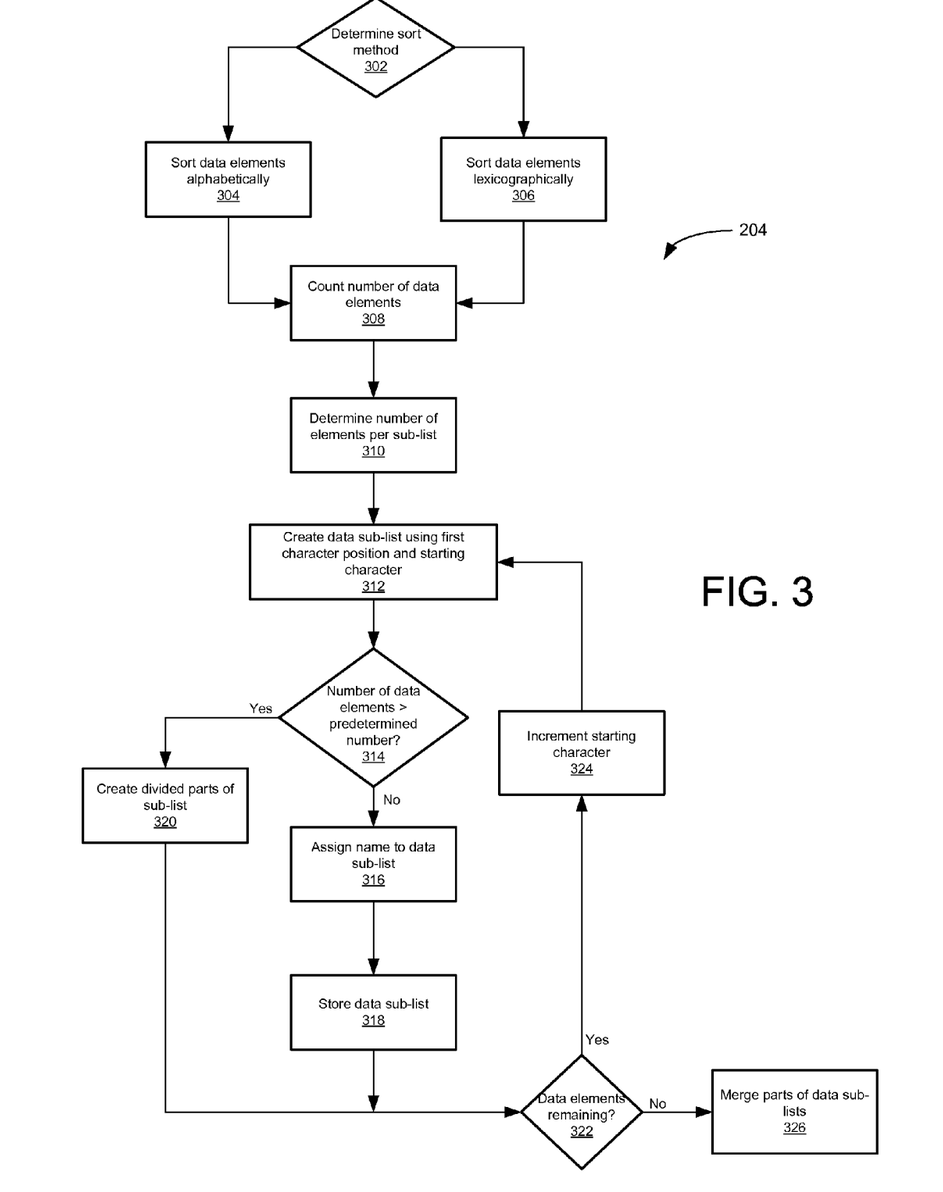
FIG. 3 is a flowchart of one example of storing data sub-lists in a database.

FIG. 3 is a flowchart of one example of storing data sub-lists in the database 114. After the processor 110 has received the data sub-list elements, a sort order of the data sub-list elements is determined (Block 302). For example, the processor 110, user, or combinations thereof, may determine to sort the data sub-list elements alphabetically or lexicographically. Sorting in lexicographical order may represent an example for a set of sub-list elements that includes sub-list elements from different other sub-lists.

The determination of whether to sort the data sub-list elements alphabetically or lexicographically may be a pre-determined operation, or the processor 110 may prompt the user via the output device 120 to select a sorting method. After this determination is made, the data sub-list elements are sorted, either alphabetically (Block 304) or lexicographically (306). Following, or during, the sort of the data sub-list elements, the processor 110 may then count the number of data sub-list elements (Block 308). Counting the data sub-list elements may include counting unique data sub-list elements, counting the total number of data sub-list elements, any other now known or later developed counting technique, or combinations thereof. The number of data sub-list elements of counted may be stored in the memory device 116 for later retrieval.

After counting the number of data sub-list elements, a determination is then made as to the number of data sub-list elements that should be in a data sub-list (Block 310). For example, the processor could determine that a data sub-list may have 50 data sub-list elements. Alternatively, or in addition to determining the number of data sub-list elements per data sub-list, the processor 110 could also determine the number of data sub-list elements per part of a divided data sub-list. For example, the processor 110 could determine that a data sub-list having 50 data sub-list elements should have 2 parts of 25 data sub-list elements. The number of data sub-list elements per data sub-list and the number of data sub-list elements per part of a divided sub-list could also be predetermined, values received by the input device 104, numbers based on the amount of the memory of the memory device 116, or combinations thereof.

The processor then creates a data sub-list using a first character position of the first data sub-list element of the sorted data sub-list elements and a starting character (Block 312). As an example, a starting character could be the alphanumeric character "A." Alternatively, a starting character could be a special character selectable from the ASCII character set. In the example given where the starting character is "A," a first data sub-list is created from the data sub-list elements where the data sub-list elements have a first character of "A."

A determination is then made as to whether the number of data sub-list elements of the created data sub-list is greater than the number previously determined of data sub-list elements per data sub-list (Block 314). If the number of data sub-list elements of the created sub-list is less than the previously determined number, the processor 110 may assign a unique name to the data sub-list (Block 316). For example, where the previously determined number of data sub-list elements per data sub-list is 50, and the number of data sub-list elements for the created data sub-list is 35, and each data sub-list elements begins with a first character of "A," the processor 110 may assign the unique name of "A" to the created data sub-list.

The processor 110 may then store the created data sub-list in the database 114 (Block 318). Storing the created data sub-list may include storing the data sub-list as a separate entity in the database 114.

However, using the example above, the number of data sub-list elements of the created data sub-may be greater than 50. For example, the number of data sub-list elements of the created data sub-list could be 75. In this example, the processor 110 would then determine to divide the data sub-list into parts (Block 320). As explained below and using the example above, dividing the created data sub-list into parts may be a recursive process until each part of the divided data sub-list has at most 50 data sub-list elements.

After the parts of the divided data sub-list are created (Block 320), or the data sub-list is stored (Block 318), a determination may then be made as to whether there are data sub-list elements remaining (Block 322). For example, the processor 110 may determine whether there are data sub-list elements remaining. If a determination is made that there are data sub-list elements remaining, the starting character is incremented to a next character (Block 324). For example, if the starting character was "A," the incremented next character may be "B." Alternatively, the incremented next character could be based on the first character of one or more data sub-list elements. For example, if the starting character was "A," but the next character of a first character of a next data sub-list element is "D," then the starting character may be incremented to the character "D." In this manner, the processor 110 may not have to exhaust an entire alphanumeric character set before determining a next character.

After assigning each of the data sub-list elements to a data sub-list, the processor 110 may then merge one or more parts of a divided data sub-list (Block 326). Merging one or more parts of a divided data sub-list may be based on predetermined criteria, for example, such as each part of a divided data sub-list may have no less than 10 data sub-list elements. In this manner, two divided parts of a data sub-list, one part having 8 data sub-list elements and the second part having 2 data sub-list elements, would be merged into a part having 10 data sub-list elements. Alternatively, the criteria may include merging parts based on a number of characters that the data sub-list elements of the parts of a divided data sub-list have in common. For example, if the data sub-list elements of a first part and the data sub-list elements of a second part have 4 initial characters in common, the first part and the second part may be merged based on this criterion. However, the parts of a divided data sub-list may not be merged.

Figure 4:
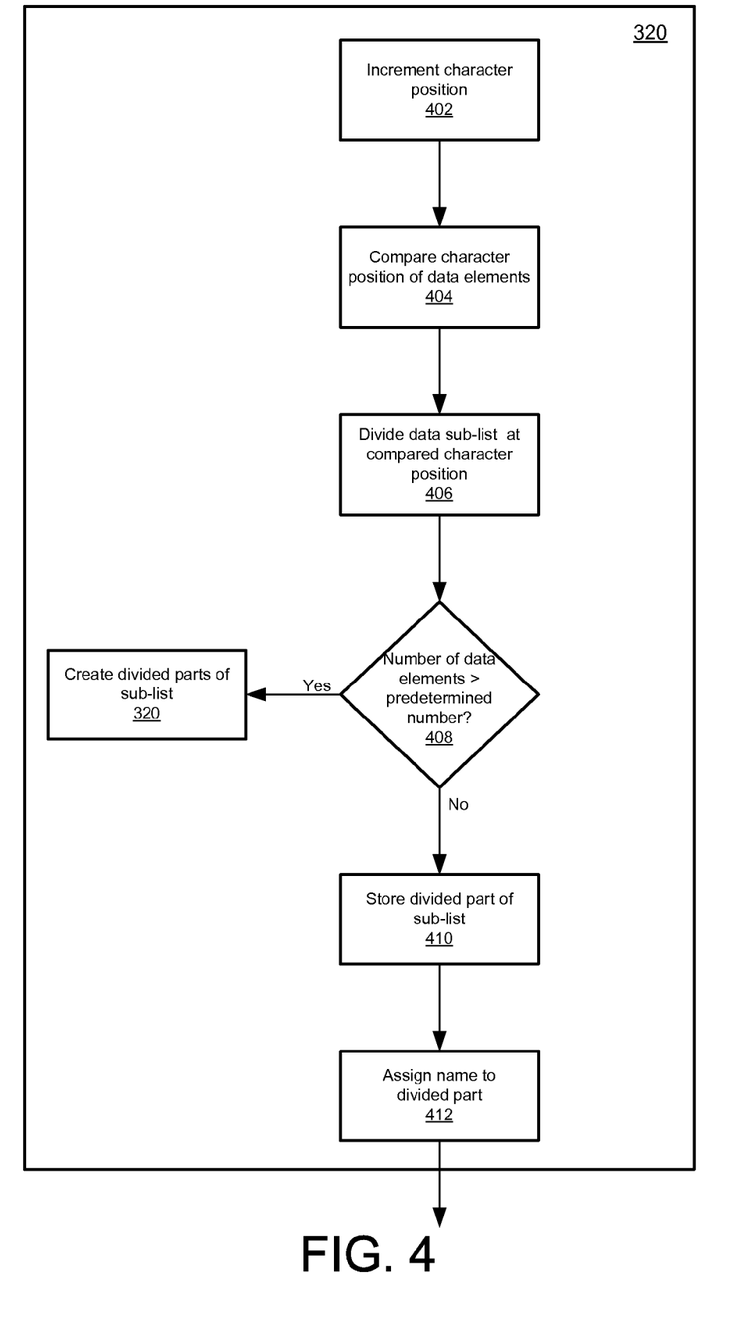
FIG. 4 is a flowchart of one example of recursively dividing data sub-lists into parts.

FIG. 4 is a flowchart of one example of recursively dividing data sub-lists into parts. After a determination has been made that a data sub-list may have more data sub-list elements than a previously determined number of data sub-list elements per data sub-list (Block 314), the processor 110 may increment to the next character position of the data sub-list elements of the data sub-list (Block 402). For example, if the initial character position used to create the data sub-list was the first character position of the data sub-list elements, then the processor 110 may increment the initial character position to the second character position of the data sub-list elements.

After incrementing the initial character position to the next character position, the processor 110 may then compare the data sub-list elements based on the incremented initial character position (Block 404). For example, the processor 110 may compare the data sub-list elements based on the second character position of the data sub-list elements. By comparing the data sub-list elements at the incremented character position, the processor 110 may be able to determine where to divide the data sub-list into parts. Comparing the data sub-list elements of the data sub-list using the incremented character position may include comparing all of the data sub-list elements of the data sub-list, a subset of the data sub-list elements of the data sub-list, or combinations thereof.

When the processor 110 determines that two data sub-list elements differ at the incremented initial character position, the processor 110 may divide the data sub-list into parts at using the compared data sub-list elements (Block 406). For example, where the fourth data sub-list element of the data sub-list has the initial characters of "AB" and the fifth data sub-list element of the data sub-list has the initial characters of "AC," the processor 110 may divide the data sub-list into parts at the fourth and fifth data sub-list element. Hence, using the example above, the processor 110 may create a first part that includes the fourth data sub-list element and a second part that includes the fifth data sub-list element.

After dividing the data sub-list into parts, the processor 110 may then determine whether each of the divided parts have a number of data sub-list elements greater than a predetermined number (Block 408). For example, if the predetermined number of data sub-list elements per part of divided sub-list is 30, but a part of the divided data sub-list has 35 elements, the processor 110 may then proceed to divide the part of the divided data sub-list into further parts. Hence, if the processor 110 determines that one or more parts of the divided data sub-list have more data sub-list elements than a predetermined number, the processor 110 may then divide those parts (Block 320). In this manner, the processor 110 may proceed recursively through one or more parts of a divided data sub-list to further divide the data sub-list.

After dividing the data sub-list into one or more parts, the one or more parts may be stored in the database 114 (Block 410). Storing the one or more parts of the divided data sub-list may include storing the parts as separate data entries in the database 114 by the processor 110. The parts of the divided data sub-list may then be assigned a unique name (Block 412). In one example, a unique name a divided data sub-list may be where a predetermined common prefix of the elements of the part of the sub-list. Alternatively, the unique name may be a predetermined number of initial characters of one or more data sub-list elements of the part of the divided data sub-list. Thus, where the data sub-list elements of a part of a divided data sub-list have one or more characters in common, the unique name assigned to the part of the divided data sub-list may include the one or more common characters. Similarly to the unique names of the data sub-lists previously discussed, the unique names assigned to the one or more parts of a divided data sub-list may be stored in the database 114. In this manner, a data sub-list may be divided into parts, the parts may then be stored, and parts may have assigned unique names.

Figure 5:
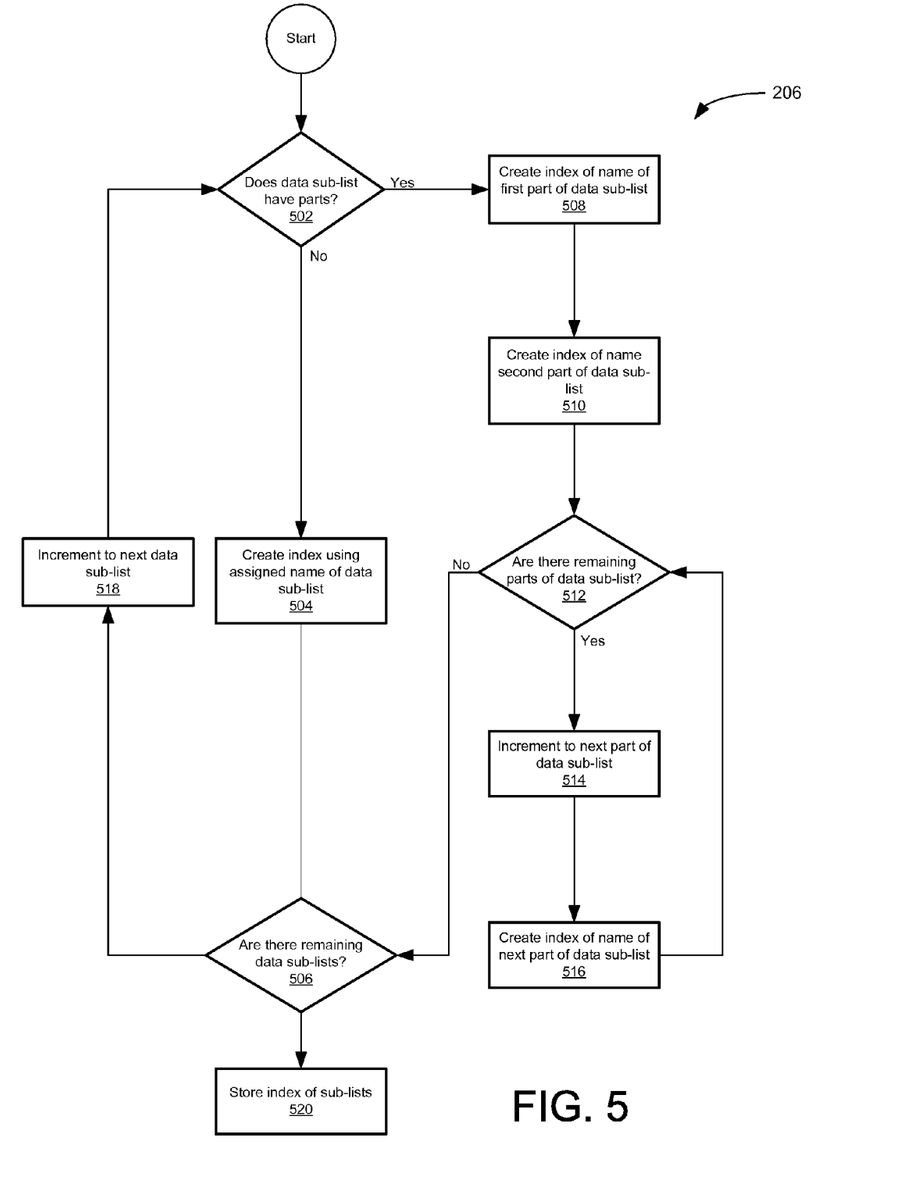
FIG. 5 is a flowchart of one example of indexing data sub-lists and parts of data sub-lists.

Following the creation and storage of the data sub-lists and the parts of one or more divided data sub-lists, the data sub-lists, the parts of one or more divided data sub-lists, or combinations thereof, are then indexed (Block 206). FIG. 5 is a flowchart of one example of indexing data sub-lists and parts of data sub-lists. Initially, the processor 110 makes a determination as to whether a data sub-list has one or more parts indicating that the data sub-list is a divided data sub-list (Block 502). If the processor 110 determines that the data sub-list has parts, the processor 110 may proceed to index the parts of the data sub-list (Block 508). Alternatively, if the processor 110 determines that the data sub-list does not have parts, the processor 110 may proceed to indexing the data sub-list (Block 502).

Where the processor 110 determines that a data sub-list does not have parts, the processor may index the data sub-list (Block 504). In one example, an index assigned to a data sub-list includes at least one alphanumeric character of one or more data sub-list elements of the data sub-list. For example, if the data sub-list contains data sub-list elements beginning with the character "A," the index assigned to the data sub-list may be the character "A." Alternatively, if the data sub-list is assigned a unique name, the index assigned to the data sub-list may include one or more characters from the assigned unique name. In yet another example, the index assigned to the data sub-list may include one or more characters of the data sub-list elements, but less than all the characters of the data sub-list elements. In this manner, the processor 110 could assign an index to the data sub-list that is a common prefix of one or more data sub-list elements.

A determination is then made as to whether there are remaining data sub-lists (Block 506). For example, if the processor 110 determines that there are no remaining data sub-lists to index, the processor 110 stores the indices of the data sub-lists (Block 520). Alternatively, the processor 110 may determine that there are remaining data sub-lists to index. Where the processor 110 determines that there are one or more remaining data sub-lists to index, the processor 110 increments to the next data sub-list (Block 518). For example, if the processor 110 started with a data sub-list where the data sub-list elements of the data sub-list started with the character "A," the processor 110 would then increment to the next data sub-list, which could be a data sub-list where the data sub-list elements begin with the character "B." Alternatively, the data sub-list could increment to a data sub-list where the data sub-list elements begin with an initial character several characters after the character "A," such as the character "F." In this manner, the processor 110 may proceed through each of the data sub-lists for indexing.

Referring back to the determination of whether a data sub-list has parts, the processor 110 may determine that a data sub-list has parts, and then may proceed to indexing the parts of the data sub-list (Block 508). As the processor 110 has already made the determination that a data sub-list has parts, the processor 110 proceeds to index the first part of the divided data sub-list. An index assigned to a part of a divided data sub-list may include at least one alphanumeric character of one or more data sub-list elements of the part of the divided data sub-list. Alternatively, if the part of the divided data sub-list is assigned a unique name, the index assigned to the part of the divided data sub-list may include one or more characters from the assigned unique name. In yet another example, the index assigned to the part of the divided data sub-list may include one or more characters of the sub-list elements from the part of the divided data sub-list, but less than all the characters of the sub-list elements. In this manner, the processor 110 may assign an index to the part of the divided data sub-list that is a common prefix of one or more sub-list elements.

After indexing a first part of the divided data sub-list (Block 508), the processor 110 then proceeds to index a second part of the divided data sub-list (Block 510). In the example shown in FIG. 5, an assumption is made that a divided data sub-list has a first part and a second part. However, the data sub-list only may have one part.

The processor 110 then makes a determination whether the data sub-list was divided into more than two parts (Block 512). If the processor 110 determines that there are no remaining parts of the data sub-list to index, the processor 110 may then proceed to determine whether there are remaining data sub-lists to index (Block 506). Alternatively, the processor 110 could determine that there are remaining parts of the divided data sub-list to index. Where the processor 110 determines that there are remaining parts of the divided data sub-list to index, the processor 110 proceeds to index the next part of a divided data sub-list (Block 516). In the example shown in FIG. 5, the next part of a divided data sub-list would be a third part of the divided data sub-list. After indexing the next part of the divided data sub-list, the processor 110 then attempts to increment to an assumed next part of the divided data sub-list (Block 514). At this point, the processor 110 makes another determination whether there are remaining parts of the divided data sub-list (Block 512).

In addition to indexing parts of the divided data sub-lists, the processor 110 could also recursively iterate through one or more parts of the divided data sub-lists to determine whether there should be additional indexing. Where a first part of a divided data sub-list includes sub-parts, the processor 110 could recursively iterate through the first part to index the sub-parts using the indexing example shown in FIG. 5. After the processor 110 has indexed all of the sub-parts of the first part of a divided data sub-list, the processor 110 could proceed to a second part of the divided data sub-list and recursively iterate through the second part in the same manner. In this example, recursive techniques may be used to index one or more sub-parts of a part of a divided data sub-list.

After the processor 110 has stored the indices for one or more data sub-lists, one or more parts of divided data sub-lists, the processor 110 stores a data list of the data sub-lists (Block 208). In one example, storing the data list may include storing database pointers in the database to one or more data sub-lists, parts of one or more divided data sub-lists, or combinations thereof. In another example, the data list could be previously stored, and the one or more data sub-lists could be created from the previously stored data list. The data list also may not be stored.

Figure 6:
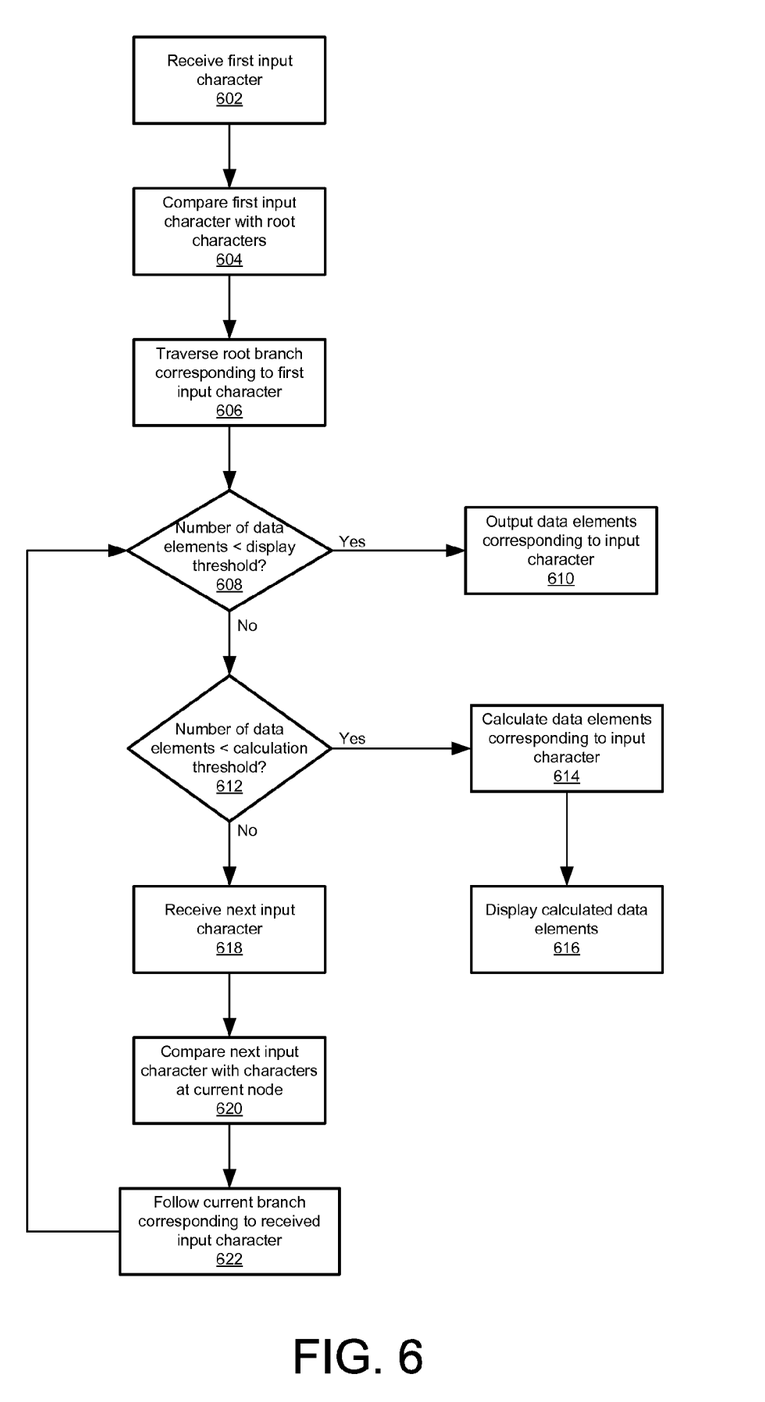
FIG. 6 is a flowchart of one example of searching and retrieving a data sub-list element from a data sub-list based on the storing and indexing methods shown in FIGS. 3-5.

FIG. 6 is a flowchart of one example of searching and retrieving a data sub-list element from a data sub-list based on the storing and indexing methods shown in FIGS. 3-5. With reference to FIG. 1 and FIG. 6, the processor 110 initially receives an input from the input device 104 (Block 602). The input from the input device 104 may be a textual input, an audio input, or combinations thereof. The input from the input device 104 may be a first character of one or more data sub-list elements stored in the database 114.

The indexing of the divided data sub-lists, the parts of the divided data sub-lists, or combinations thereof, may create a set of indices according to a tree structure representing possible characters to be input by a user of the database. The tree structure may have a root nodes, child nodes, branches, leaves, or combinations thereof. The root node of the tree structure may have branches representing a first input character. One or more branches from the root node, child nodes, or combinations thereof, may correspond to additional characters inputtable by a user. Alternatively, the tree branches may be associated with data sub-lists and parts of divided data sub-lists.

Searching for a data sub-list element, such as a predetermined data position, may be performed along the tree structure, such as along the branches of the tree structure. The branches to be chosen during a search may be determined by comparing searched data entries with comparative values stored in the nodes, branches, leaves, or combinations thereof. However, it may be that the comparative values are not complete data entries of all the data sub-list elements of the database 114, but are initial characters of the data sub-list elements. As an example, an input of "ABC" may result in a further search along branches "ABCD" and "ABCDE".

Accordingly, after the processor 110 receives an input from the input device 104, the processor 110 compares the input with the root characters of the root node (Block 604). Alternatively, the processor 110 may compare the input from the input device 104 with one or more comparative values stored in the root node. After comparing the input character with one or more comparative values, one or more root characters, or combinations thereof, the processor 110 traverses the root branch corresponding the compared input character (Block 606).

In creating the data sub-lists, parts of divided data sub-lists, or combinations thereof, the processor 110 also may generate information on the number of parts of a sub-list, the number of sub-list elements, or combinations thereof, matching a possible input. For example, this information may be stored in the nodes of the tree structure. In addition, a predetermined display threshold number may be established that determines the number of data sub-list elements to display at a time. In one example, the predetermined display threshold may be based on the resolution of a display device coupled with the navigation system 102. After receiving an input from the input device 104 and traversing the corresponding root node branch, the processor may make a determination as to whether the number of possible data sub-list elements is less than the predetermined display threshold (Block 608). If the number of sub-list elements matching a character string input by a user lies below a predetermined threshold, the matching sub-list elements may be output on the output device 120 (Block 610).

However, the number of matching sub-list elements also may be greater than the predetermined display threshold. Thus, the processor 110 may continue down the branches of the tree structure. Each branching may correspond to one next character that can possibly be input by a user. After one or more branching the tree structure may end in leaves, where each leave of the tree structure may refer to one sub-list element matching an input. Alternatively, one or more leaves could represent a starting point for calculating a sub-list element matching the input received by the processor 110.

After determining whether the number of matching data sub-list elements is greater than the predetermined display threshold, the processor 110 may then determine whether to calculate the remaining data sub-list elements (Block 612). For example, a predetermined calculation threshold may be used to indicate to the processor 110 when to begin calculating remaining data sub-list elements. The predetermined calculation threshold may be based on the possible memory available to the system, the speed of the processor, any other possible measurements, or combinations thereof. The predetermined calculation threshold could also be the display threshold. Alternatively, the processor 110 could have followed a branch to a node or leaf that indicated to the processor 110 to begin calculating one or more data sub-list elements. If the processor 110 determines to calculate one or more data sub-list elements, the processor 110 may then calculate one or more data sub-list elements matching the received input (Block 614). Calculating may include following one or more branches to additional nodes or leaves based on the received input. After the processor 110 has calculated the remaining data sub-list elements, the processor 110 may then communicate with the output device 120 to display the calculated data sub-list elements (Block 616).

Alternatively, the processor 110 may determine that the remaining number of data sub-list elements are greater than a predetermined calculation threshold. The processor 110 also may follow a branch to a node having one or more additional branches. Where the processor 110 determines that the remaining number of data sub-list elements is greater than the calculation threshold, the processor 110 receives another input from the input device (Block 618). The processor 110 may receive another input from the input device 104 in response to a prompt or message from the output device 120. Alternatively, the processor 110 may receive another input from the input device 104 without prompting.

In one example, a sub-list may be assigned the sub-list name "Ab" and include three further sub-lists named "Abcd", "Abce" and "Abd", respectively. According to this example, after an input of "Abc" the sub-list names "Abcd" and "Abce" may be offered on the output device for a continued input.

After receiving the next input from the input device 104, the processor 110 compares the next input with the characters or comparative values of the branches, nodes, or combinations thereof, of the current node (Block 620). Based on the comparison, the processor 110 then follows the corresponding branch to the next node (Block 622). The next node reached by the processor 110 may be a leaf, in which case, the processor 110 may cause the output device 120 to display the data sub-list element corresponding to the leaf. Alternatively, the processor 110 may make another determination as to whether the remaining data sub-list elements are less than the predetermined display threshold (Block 608). However, the next input received may not correspond to any remaining data sub-list elements, in which case the processor 110 may cause the output device 120 to output an error message.

Although the example in FIG. 6 was described in terms of receiving one input character at a time, the processor 110 also may receive an input string of characters. For example, the processor 110 may receive an entire word or other combination of characters. In this example, the processor 110 may proceed through the tree structure previously described until one or more data sub-list elements are output on the output device 120, or until the processor 110 completely exhausts the tree structure and does not locate a data sub-list element corresponding to the entire word or other combination of characters.

Figure 7:
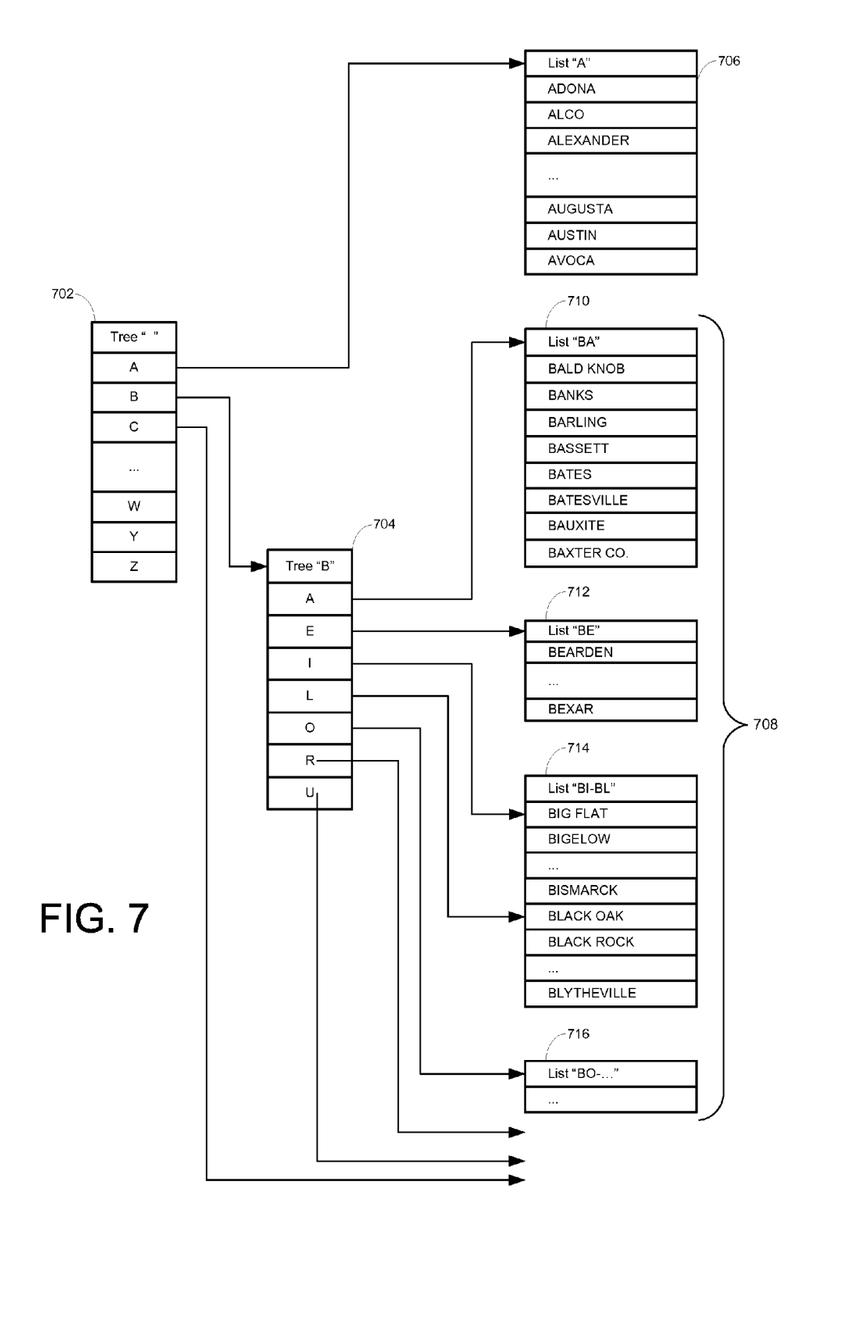
FIG. 7 is a block diagram of one example of data sub-list elements stored alphabetically in data sub-lists and parts of data sub-lists.

FIG. 7 is a block diagram of one example of data sub-list elements stored alphabetically in data sub-lists and parts of data sub-lists. A complete data list to be stored in a database is divided into multiple lists. The multiple lists include a first list 706 labeled "List 'A'" and a second list 708 divided into multiple parts. The multiple parts 710, 712, 714, and 716 have been divided according to a predetermined number of data sub-list elements. For example, each of the parts 710, 712, 714, and, 716 of the second sub-list 708 have at most 50 data sub-list elements. The data list may be indexed by an index structure representing inputtable first characters at a root node 702. Each sub-list is then indexed separately at a child node 704 branching from the root node 702.

The indices may represent a tree structure according to the possible input of characters. The root node 702 of the tree structure, as shown on the left hand side of FIG. 7, branches in accordance with possible input characters for the data sub-list elements. Each branch of the tree include all possible next characters following the present input represents one stage of an input. For example, using the tree structure shown in FIG. 7, a user may choose "B" as a first input character. The tree branches for "B" according to possible second characters that may be input, namely, "A", "E", "I", "L", "O", "R" and "U".

The indices also may be assigned to names of parts 710, 712, 714, and 716 of the divided data sub-list 708, including "BA", "BE", etc. In one example, the tree structure ends in a leaf with a reference to the first sub-list element as soon as the number of sub-list elements is below 50 (as it is the case for an initial character of "A"). When an input of "BA" is received, an output is displayed of the part 710 of the divided data sub-list entitled "List 'BA'". A user may then choose a data sub-list element, e.g., Baxter Co using the input device 104, such as through a keyboard, touch screen LCD, or through speech. In this example, the sub-list elements are sorted in alphabetical order.

Figure 8:
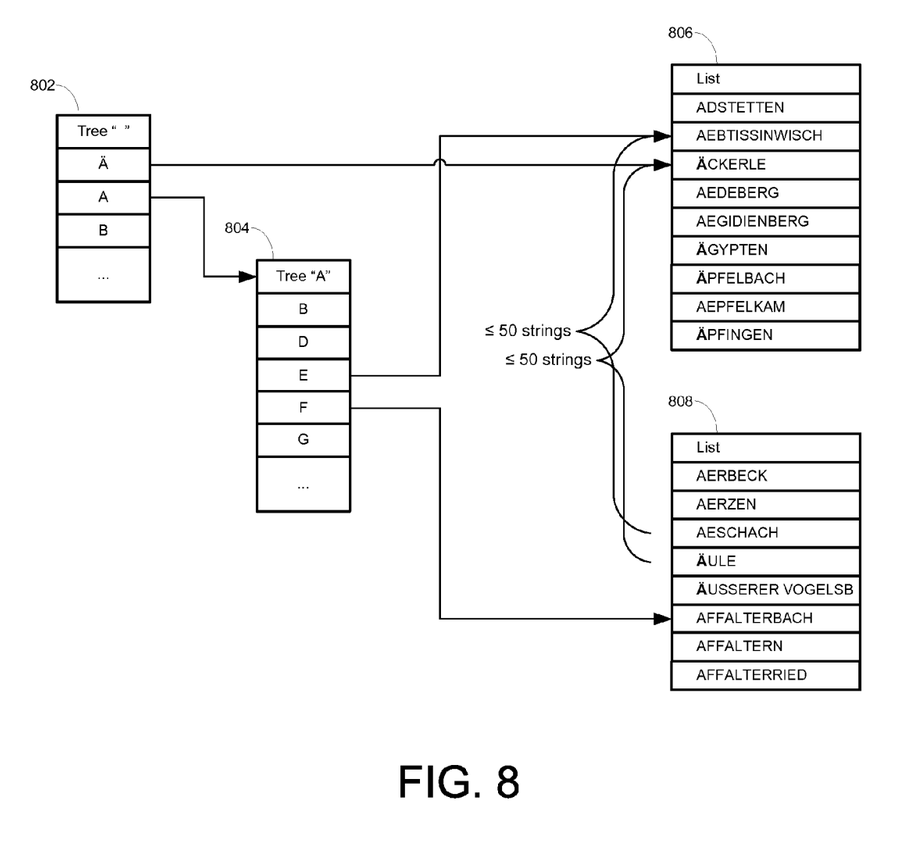
FIG. 8 is a block diagram of one example of data sub-list elements stored lexicographically in data sub-lists.

FIG. 8 is a block diagram of one example of data sub-list elements stored lexicographically in data sub-lists. The tree structure of FIG. 8 has a root node 802 and a child node 804. The root node 802 points to the child node 804 and a first data sub-list 806. The child node 804 also points to the first data sub-list 806, but it also points to the second data sub-list 808. Using a lexicographical sort order, the German umlaut "Ä" is sorted equal to the character string "AE". This may imply that strings with an "Ä" are mixed with those strings containing an "A" at the same position. Furthermore, the tree structure may end as soon as the number of all possible sub-list elements that are constricted at previous stages (branches of the tree) is below a predetermined number. 50. Since the only six (≤50) sub-list elements with an initial letter "Ä" are present, the processor 110 may cause the output device 120 to output the sub-list elements starting with an "A" when the processor 110 receives the character "Ä" from the input device 104.

In other words, the input character "Ä" is linked to a list leaf that contains all list elements with names starting with "Ä". If, however, more strings with an initial "AE" were present in the data list, the indexing structure may be modified by introducing a branch node for "Ä", even though there are still only six matches for an initial string "Ä". It should be noted that other kinds of sorting schemes for the sub-list elements might be employed.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

I claim:

1. A method for indexing a database, comprising:
    receiving sub-list elements that comprise the database;
    counting the sub-list elements;
    determining a number of the sub-list elements to be placed in a data sub-list;
    assigning each of the sub-list elements to at least one data sub-list, where each of the data sub-lists includes at least one sub-list element comprising at least one word but not more sub-list elements than the determined number;
    storing each of the data sub-lists in the database as a separate data entity;
    storing at least one data list in the database, where the at least one data list includes at least two data sub-lists such that the at least one data list is accessible to a user of the database; and
    separately indexing each of the data sub-lists where indexing includes assigning an index to the at least one sub-list element of the corresponding data sub-list that does not extend over the entire corresponding data list-such that the index includes at least one alphanumeric character of the at least one sub-list element of the corresponding data sub-list,
    where the indices are used to index the database as a data tree structure and are representative of alphanumeric characters input by a user of the database; and
    the data tree structure has at least one branch node and at least one leaf, where the at least one branch node is a comparative value representative of a prefix of the at least one sub-list element of the corresponding data sub-list.

2. The method of claim 1, where the steps of receiving and counting further comprise arranging the sub-list elements in alphabetical order.

3. The method of claim 1, where the steps of receiving and counting further comprise arranging the sub-list elements in lexicographical order.

4. The method of claim 1, where each index includes at least one character of the at least one sub-list element of the corresponding data sub-list and less than all of the characters of the at least one sub-list element of the corresponding data sub-list.

5. The method of claim 4, where each index is a common prefix of two or more sub-list elements of the corresponding data sub-list.

6. The method of claim 1, where the at least one leaf corresponds to the at least one sub-list element of the corresponding data sub-list for matching alphanumeric characters input by the user.

7. The method of claim 1, where the at least one leaf corresponds to a starting point for calculating the at least one sub-list element of the corresponding data sub-list based on alphanumeric characters input by the user.

8. The method of claim 1, where at least one data sub-list is divided into parts that each include at least one sub-list element and each divided part of the corresponding data sub-list is assigned a corresponding unique name, where the unique name is a predetermined common prefix of the sub-list elements of the part of the corresponding data sub-list; and
    indexing of the database further includes assigning an index to each part of the at least one data sub-list, where each index represents at least one character of the unique name of the corresponding part of the at least one data sub-list.

9. The method of claim 8, where
    the indices are used to index the database as a data tree structure and are representative of alphanumeric characters input by a user of the database; and
    the data tree structure has at least one branch node and at least one leaf, where the at least one branch node is a comparative value representative of a prefix of at least one part of the divided parts of the at least one data sub-list.

10. The method of claim 9, where the at least one leaf corresponds to the at least one sub-list element of the at least one data sub-list matching alphanumeric characters input by the user.

11. The method of claim 9, where the at least one leaf corresponds to a starting point for calculating the at least one sub-list element based on alphanumeric characters input by the user.

12. The method of claim 1, where the at least one data list further comprises the at least one data sub-list arranged in alphabetical order.

13. The method of claim 1, where the at least one data list further comprises the at least one data sub-list arranged in lexicographical order.

14. The method of claim 1, where the at least one sub-list element of the at least one data sub-list is a geographical location.

15. The method of claim 1, where the database is a navigational database usable in a vehicle navigation system.

16. A vehicle navigation system, comprising:
    an input device configured to receive an input from a user;
    a storage device configured to store a database;
    a processor coupled with the storage device, where
        the processor is configured to receive sub-list elements that comprise the database, counting the sub-list elements, determining a number of the sub-list elements to be placed in a data sub-list, assigning each of the sub-list elements to a data sub-list, where each of the data sub-lists includes at least one sub-list element comprising at least one word but not more sub-list elements than the determined number;
        the processor is further configured to store at least one data sub-list in the database as a separate data entity, where the at least one data sub-list includes at least one sub-list element comprising at least one word;

the processor is further configured to separately index the at least one data sub-list by assigning a first index to the at least one sub-list element of the at least one data sub-list, such that the first index includes at least one alphanumeric character of the at least one sub-list element of the at least one data sub-list, and the processor is further configured to store at least one data list in the database, where the at least one data list includes at least two data sub-lists such that the at least one data list is accessible, and to index the database as a data tree structure using the indices, such that the indices are representative of alphanumeric characters receivable by the input device;

the data tree structure has at least one branch node and at least one leaf, where the at least one branch node is a comparative value representative of a prefix of either the at least one sub-list element of the first at least one data sub-list; and an output device configured to output at least one sub-list element of the at least one data sub-list based on an input received by the input device.

17. The system of claim 16, where the at least one data sub-list further comprises a plurality of sub-list elements, and the sub-list elements are arranged in alphabetical order.

18. The system of claim 16, where the at least one data-sub list further comprises a plurality of sub-list elements, and the sub-list elements are arranged in lexicographical order.

19. The system of claim 16, where the each index includes at least one character of the at least one sub-list element of the corresponding data sub-list and less than all of the characters of the at least one sub-list element of the corresponding data sub-list.

20. The system of claim 19, where the each index is a common prefix of two or more sub-list elements of the corresponding data sub-list.

21. The system of claim 16, where the at least one leaf corresponds to the at least one sub-list element of the at least one data sub-list matching alphanumeric characters receivable by the input device.

22. The system of claim 16, where the at least one leaf corresponds to a starting point for calculating the at least one sub-list element of the at least one data sub-list based on alphanumeric characters receivable by the input device.

23. The system of claim 16, where:

the processor is further configured to divide the at least one data sub-list into parts that include at least one sub-list element and each divided part of the at least one data sub-list is assigned a corresponding unique name, where the unique name is a predetermined common prefix of the elements of the part of the at least one data sub-list; and the processor is further configured to index the database by assigning an index to each part of the at least one data sub-list, where each index represents at least one character of the unique name of the corresponding part of the at least one data sub-list.

24. The system of claim 23, where
the processor is further configured to index the database as a data tree structure using the indices, where the first and second indices are representative of alphanumeric characters receivable by the input device; and the data tree structure has at least one branch node and at least one leaf, where the at least one branch node is a comparative value representative of a prefix of at least one part of the divided parts of the at least one data sub-list.

25. The system of claim 24, where the at least one leaf corresponds to the at least one sub-list element of the at least one data sub-list matching alphanumeric characters receivable by the input device.

26. The system of claim 24, where the at least one leaf corresponds to a starting point for calculating the at least one sub-list element based on alphanumeric characters receivable by the input device.

27. The system of claim 16, where the at least one data list further comprises the at least one data sub-list arranged in alphabetical order.

28. The method of claim 16, where the at least one data list further comprises the at least one data sub-list arranged in lexicographical order.

29. The system of claim 16, where the at least one sub-list element of the at least one data sub-list is a geographical location.

30. A vehicle navigation system, comprising:
an input device configured to receive an input from a user;
a storage device configured to store a database;
first means for receiving sub-list elements that comprise the database, counting the sub-list elements, determining a number of the sub-list elements to be placed in a data sub-list, assigning each of the sub-list elements to a data sub-list, where each of the data sub-lists includes at least one sub-list element comprising at least one word but not more sub-list elements than the determined number;

second means for storing at least one data sub-list in the database as a separate data entity, where the at least one data sub-list includes at least one sub-list element comprising at least one word;

third means for separately indexing the at least one data sub-list by assigning an index to the at least one sub-list element of the at least one data sub-list such that the index includes at least one alphanumeric character of the at least one sub-list element of the at least one data sub-list;

fourth means for storing at least one data list in the database, where the at least one data list includes at least two data sub-lists such that the at least one data list is accessible, for indexing the database as a data tree structure using the indices, such that the indices are representative of alphanumeric characters receivable by the input device, where the data tree structure has at least one branch node and at least one leaf, where the at least one branch node is a comparative value representative of a prefix of either the at least one sub-list element of the first at least one data sub-list; and an output device configured to output at least one sub-list element of the first data sub-list based on input received by the input device.

* * * * *

UNITED STATES PATENT AND TRADEMARK OFFICE
CERTIFICATE OF CORRECTION

| | | |
|---|---|---|
| PATENT NO. | : 8,775,432 B2 | Page 1 of 1 |
| APPLICATION NO. | : 11/752418 | |
| DATED | : July 8, 2014 | |
| INVENTOR(S) | : Jens Gelhar | |

It is certified that error appears in the above-identified patent and that said Letters Patent is hereby corrected as shown below:

In the Specification

Column 2
Line 48, please delete "Bach" and insert -- Each --

Signed and Sealed this
Ninth Day of September, 2014

Michelle K. Lee
*Deputy Director of the United States Patent and Trademark Office*